(12) United States Patent
Shima et al.

(10) Patent No.: US 6,720,677 B2
(45) Date of Patent: Apr. 13, 2004

(54) POWER LINES AND APPARATUS USING THE SAME

(75) Inventors: Kazuo Shima, Hitachi (JP); Miyoshi Takahashi, Hitachi (JP); Masaki Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 87 days.

(21) Appl. No.: 09/791,721

(22) Filed: Feb. 26, 2001

(65) Prior Publication Data

US 2001/0052732 A1 Dec. 20, 2001

(30) Foreign Application Priority Data

Jun. 20, 2000 (JP) .................................... 2000-189713

(51) Int. Cl.$^7$ ............................................. H01B 11/02
(52) U.S. Cl. ......................... 307/147; 307/89; 307/90; 307/91
(58) Field of Search ........................... 307/147, 91, 89, 307/90

(56) References Cited

U.S. PATENT DOCUMENTS

| | | | | |
|---|---|---|---|---|
| 3,896,380 A | * | 7/1975 | Martin | 325/28 |
| 4,087,711 A | * | 5/1978 | Kirtley, Jr. et al. | 310/184 |
| 5,463,303 A | * | 10/1995 | Hall et al. | 320/2 |
| 5,864,094 A | * | 1/1999 | Griffin | 174/105 R |

* cited by examiner

*Primary Examiner*—Robert DeBeradinis
(74) *Attorney, Agent, or Firm*—Antonelli, Terry, Stout & Kraus, LLP

(57) ABSTRACT

Power lines include three or more conductors for transmitting alternating currents. The conductors are arranged in one combination of the conductor arrangement so that the sum of phase differences between the currents flowing through adjacent conductors is maximum, and if there exists a plurality of such combinations, the one combination is selected in which the value of the smallest one of the phase differences between the currents flowing through every adjacent conductor is largest. With this arrangement, power loss is reduced.

15 Claims, 3 Drawing Sheets

POWER LINES AND APPARATUS USING THE SAME

BACKGROUND OF THE INVENTION

1. Field of the Invention

The present invention relates to an arrangement of conductors for power lines using alternating current, and more particularly, to rotating electric machine, electric apparatus, power supply apparatus, power conversion apparatus and power transmission lines having power lines using alternating current.

2. Description of the Related Art

When arranging parallelly a plurality of conductors to transmit alternating currents, the method of arranging the conductors has not been satisfactorily taken into consideration of conventional power lines. For example, in electric apparatus having power lines in which six conductors transmitting, respectively, to-and-fro currents of balanced three phases U, V and W are arranged in a row, the conductors are arranged in an order of +U, −V, +W, −U, +V and −W phases so that the phase difference between the currents flowing through adjacent conductors is small.

In the above case, since the magnetic field induced into a conductor by a current flowing through the other conductor is large, it is possible that the loss by an eddy current produced in the conductor is large, resulting in necessity of more devices and much cost for cooling the conductors. Further, it is possible that the electrical efficiency of the power lines is reduced or that it is required to make larger the distance between adjacent conductors so that the size of the power lines becomes larger.

SUMMARY OF THE INVENTION

An object of the present invention is to provide power lines having conductor arrangement capable of reducing the above loss so that the power efficiency is made higher thereby requiring less devices and less cost for cooling the conductors.

Another object of the present invention is to provide rotating electric machines, electric apparatus, power supply apparatus, power conversion apparatus and power transmission lines of large electric currents, which use the above power lines thereby increasing the power efficiency and requiring less cost of devices for cooling the conductors.

In order to achieve the above object, in the power lines of the present invention in which three or more conductors transmitting alternating currents of different phases are disposed parallelly with each other, the conductor arrangement is determined such that from all the combinations in arrangement of the conductors, which are obtained by exchanging every two of the conductors, those combinations are first selected in which the sum of the phase differences between the currents flowing through every adjacent two conductors is maximum and then from those selected combinations, one combination is selected in which the smallest one of the values of the phase differences between the currents flowing through every adjacent conductors is largest and the conductor arrangement as determined is corresponding to that in the selected one combination.

Further, in the power lines having 2n conductors respectively transmitting the to-and-fro currents of n-phase alternating current and arranged parallelly with each other in a row, the conductors are arranged such that the phase differences between the currents flowing through every adjacent two conductors are in an order of the phase angles 180, (180−180/n), 180, (180−180/n), . . . 180 and (180−180/n) degrees, successively, from one end of the row.

Further, in the power lines including six conductors transmitting the to-and-fro currents of +U, +V, +W, −U, −V and −W phases of 3-phase alternating current and disposed parallelly with each other in a ring shape, the phase differences between the currents flowing through every adjacent conductors are in an order of the phase angles 180, 120, 120, 180, 120, and 120 degrees successively.

Further, in the power lines having 2n conductors transmitting respective phases of 2n-phase alternating currents and disposed parallelly with each other in 2 rows and n stages, the conductors are arranged such that the distance between adjacent conductors in the same stage is larger than the distance between adjacent conductors in the same row, the phase difference between the currents passing through every adjacent conductors in the same row is 180 degrees and the phase difference between the currents passing through every adjacent conductors in the same stage is (180−180/n) degrees.

Further, the present invention provides an apparatus such as rotating electric machine, electric apparatus including power generator, power supply apparatus, power conversion apparatus and power transmission line, which requires to handle a large current, and includes the power lines having any of the above-mentioned conductor arrangements.

By the above arrangement, the present invention is capable of reducing the whole loss of the conductors, increasing the power efficiency and requiring less devices for cooling the conductors thereby decreasing the cost for the devices.

DETAILED DESCRIPTION OF THE EMBODIMENTS

Now, the present invention will be explained with reference to FIGS. 1 to 4.

Figure 1:
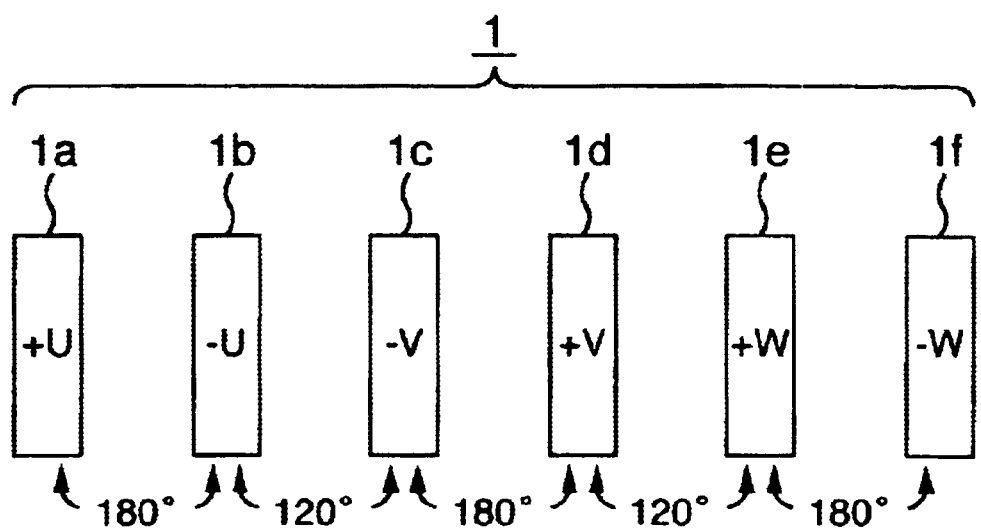
FIG. 1 is a sectional view of the conductor arrangement in power lines for alternating current according to one embodiment of the present invention.
Figure 2:
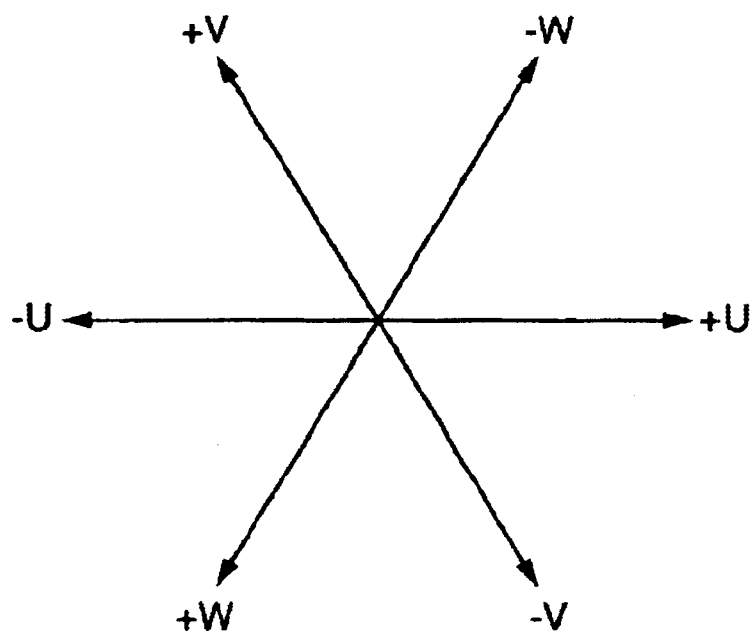
FIG. 2 is a phasor representation showing the phase relationship of the currents passing through the conductors 1 in FIG. 1 or 3 or 4.

FIG. 1 is a sectional view of the conductor arrangement in power lines for alternating current according to one embodiment of the present invention. Conductors $1a$ to $1f$ are conductive wires disposed parallelly with each other and FIG. 1 is a sectional view along a plane perpendicular to the direction of the current which flows in a direction penetrating the sheet. The currents flowing through the respective conductors have almost equal amplitudes and the same frequency but have different phases. Here, the frequency and the phase are those of the frequency component having the largest amplitude and the alternating currents are not always necessary to have the sinusoidal waveform. The conductors 1a to 1f are a part of power lines using balanced three phase alternating currents, such as, for example, wirings of electric apparatus or power lines. In the embodiment of FIG. 1, the conductors 1 are arranged so as to transmit the to-and-fro currents of the balanced 3 phases of U, V and W such that the currents of +U. −U, −V, +V, +W and −W phases flow through the conductors 1a, 1b. 1c. 1d, 1e and 1f, respectively. Here, the phase relationship of the respective phases is shown in FIG. 2 as a phasor representation according to the alternating current theory. This conductor arrangement has a feature in that the conductors are arranged such that in all combinations in arrangement of the conductors 1a to 1f to which the currents of six different phases of +U, −U, +V, −V, +W and −W are allotted respectively, a combination is selected in which the sum of phase differences between the currents flowing through every adjacent conductors is maximum and if there exist a plurality of such combinations, one is further selected from the plural combinations in which the value of the maximum phase difference between the currents flowing through every adjacent conductors is smallest. Thus, the phase differences between the currents through 1a and 1b, 1b and 1c, 1c and 1d, 1d and 1e and 1e and 1f are 180, 120, 180, 120 and 180 degrees as phase angles, respectively. This relationship of the current phase differences is also shown in FIG. 1. Therefore, the sum of the phase differences is 780 degrees which is maximum among all the above combinations. In addition, the smallest one of the values of the phase differences between the currents in adjacent conductors is 120 degrees which is also the largest. Here, the minimum and maximum values of the phase difference between the currents in adjacent conductors are defined as 0 and 180 degrees, respectively. For example, the phase difference of 240 degrees is defined as 120 degrees, since the phase difference of 240 degrees is equivalent to the phase difference of 120 degrees because of 360−240=120 degrees. The effect of the present invention is obtained if the values of the relative phase differences between the respective conductors are in the above relationship. Therefore, although the conductor 1a is allotted to the U phase in the embodiment of FIG. 1, the same effects are obtained by allotting the conductor 1a to the phase other than U, and then successively disposing the conductors 1b to 1f so that the relative phase differences between every adjacent conductors are in the above relationship.

Although the specific conductor arrangement for specific current combination has been described in the above embodiment of the present invention, the number of conductors may be any of three or more, the current flowing through the conductors may be other than that of the balanced three-phase and the currents flowing through the respective conductors may be of any phases. Further, it is not always necessary that the currents flowing through the respective conductors are of different phases and some of the conductors may transmit the currents of the same phase. Although the effects of the present invention will be high when the currents flowing through the respective conductors have almost the same amplitude, it is possible to obtain the effects of the present invention even if the amplitudes of the respective currents are substantially different. Further, the conductors may be arranged in other than one row. That is, even when the conductors are disposed in another arrangement, it is enough to determine the conductor arrangement in the same manner as in FIG. 1 such that from all the possible combinations in arrangement of the conductors, those combinations are first selected in which the sum of phase differences between the currents of adjacent conductors is maximum and then from the selected combinations, one combination is selected in which the value of the smallest phase difference between the currents of adjacent conductors is largest.

Incidentally, the conductor section may be in any form. Further, the conductor may be divided into a plurality of element wires.

Next, the principle of the present invention will be described. Suppose that three or more conductors are arranged parallelly with each other and alternating currents of different phase are transmitted through the respective conductors. However, it is unnecessary that the currents flowing through all the conductors have different phases but some of the currents may be in the same phase. When a current flows through one of the conductors, an alternating magnetic field having the same frequency and the same phase as those of the current is produced around the one conductor. If there exists another conductor within the magnetic field, the magnetic field would interlink with the other conductor so that an eddy current will be produced in the other conductor by the interlinked magnetic field, resulting in undesired loss. In order to make this loss smaller as possible, the interlinkage of the alternating magnetic field with the other conductor must be reduced to minimum. To the end, the whole conductors are arranged so that there exists, adjacent to each conductor transmitting an alternating current, another conductor transmitting another alternating current having a phase difference as large as possible with respect to the phase of the alternating current flowing through the first-mentioned conductor. The present invention has a feature in that the conductors are arranged in this manner. By this arrangement, the alternating magnetic field produced by one conductor is efficiently cancelled by the alternating magnetic field produced by the adjacent conductor so that the circumferential magnetic field is decreased thereby reducing the undesired loss. Further, since it is possible for the present invention to decrease the circumferential magnetic field, the distance between adjacent conductors can be decreased instead of reducing the undesired loss. Incidentally, the circumferential magnetic field is larger as the current source is closer.

Figure 5:
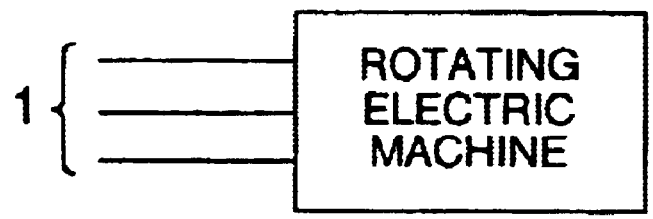
FIG. 5 schematically shows a rotating electric machine or electric apparatus using power lines according to the present invention.
Figure 6:
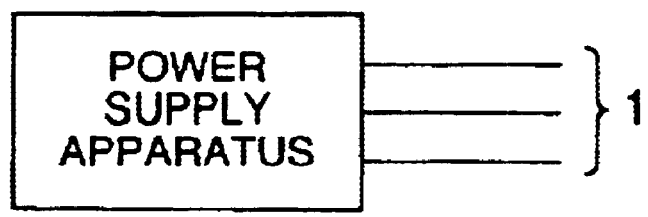
FIG. 6 schematically shows power supply apparatus including power generator using power lines according to the present invention.
Figure 7:
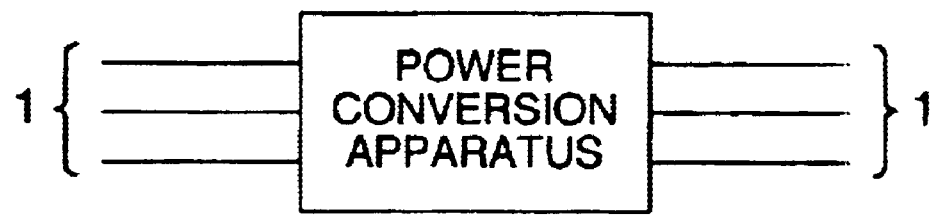
FIG. 7 schematically shows power conversion apparatus using power lines according to the present invention.

Further, since the magnitude of the eddy current produced in the conductor by the electromagnetic induction is greatly effected by size of the sectional area of the conductor relative to the skin depth, the effect of the present invention as compared with that of the conventional method is greater as the ratio of the size (the lengthwise and widthwise lengths) of the section of the conductor 1 relative to the skin depth of the conductor material 1 is larger. Especially, the effect is remarkable when the above ratio is in an order of 1 or more. Concretely, for example, the skin depth is about 10 mm or more for the frequency of 50 Hz. Incidentally, the definition of the skin depth is described in various literatures, for example, in "Electromagnetics" by Shigeo Umoto, (published by Shokodo) pp. 326, First edition, Heisei 2 (1990) April 20. From the above, it will be appreciated that the effect of the present invention is greater as the sectional size of the conductor is larger. Especially, in the devices handling a large current such as rotating electric machine, electric apparatus including power generator, power supply apparatus, power conversion apparatus and power transmission line, the sectional area of the conductor is large due to limitation of the current density. Therefore, the effect of the present invention is especially remarkable for rotating electric machine, electric apparatus, power supply apparatus including power generator, power conversion apparatus and power lines. Incidentally, rotating electric machine such as motor or switch board is shown in FIG. 5, generator as a power supply apparatus is shown in FIG. 6 and rectifier or the like is shown in FIG. 7.

As above-mentioned, in the conductor arrangement according to the present invention, the conductors are arranged such that the phase differences between the currents of every adjacent conductors are larger thereby making smaller the total resistance loss produced in the whole conductors. Therefore, it is possible to reduce the undesired power consumption due to the loss of the conductor wirings. Thus, by applying the present invention to rotating electric machine, electric apparatus, power supply apparatus, power conversion apparatus, power transmission line or the like, it is possible to improve the power efficiency in them. Further, since the loss is reduced, it is also possible to use less devices and less cost for cooling the conductors. Further, instead of reducing the total resistance loss in the whole conductor arrangement, it is possible for the present invention to reduce the distance between adjacent conductors. Therefore, by applying the present invention to rotating electric machine, electric apparatus, power supply apparatus including power generator, power conversion apparatus, power transmission line or the like, it is possible to make smaller the size thereof.

Next, the method of determining the conductor arrangement when a plurality of conductors are to be disposed in one row, which is more simple than taking into consideration all the combinations in the conductor arrangement, will be explained. The procedure for disposing six conductors transmitting six kinds of currents as shown in the phasor diagram of FIG. 2 in an arrangement as shown in FIG. 1 will be explained by way of example. First, any conductor may be used as the leftmost one. A conductor of +U is used in FIG. 1 by way of example. Next, the left-hand second one is a conductor transmitting a current of a phase remotest from the phase of the current flowing through the leftmost conductor, that is the conductor −U. The left-hand third one is a conductor other than the conductor −U and transmitting a current of a phase remotest from the phase of the current flowing the left-hand second conductor, that is the conductor −W or −V. A conductor −V is used in FIG. 1 by way of example. The fourth conductor is a conductor other than any of the left-hand first and second conductors and transmitting a current of a phase remotest from the left-hand third conductor. That is the conductor +V. By a similar way, the arrangement of all other conductors is determined.

When applying the above conductor arrangement of the present invention to the case in which 2n conductors (n=2, 3, 4 . . . ) transmitting the to-and-fro currents of n-phase are arranged in one row, the conductors are arranged such that the phase differences between the currents flowing through respective adjacent conductors are in an order of the phase angles 180, (180−180/n), 180, (180−180/n), . . . 180, (180−180/n) degrees successively from the one end of the row. In this case, the same effect as that in the embodiment of FIG. 1 can be obtained.

Figure 3:
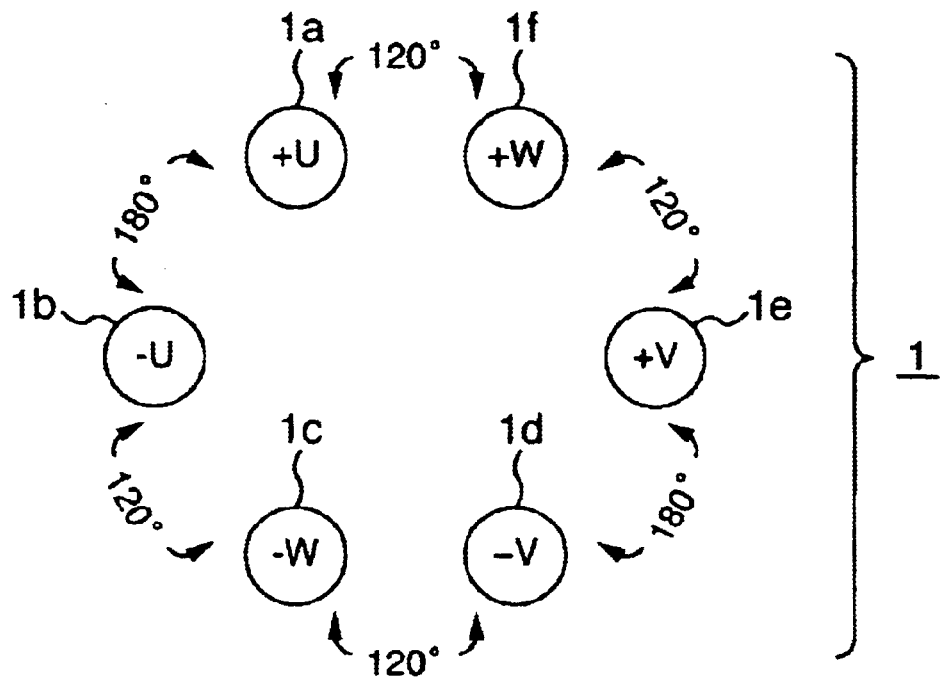
FIG. 3 is a sectional view of the conductor arrangement in power lines for alternating current according to another embodiment of the present invention.

FIG. 3 shows a sectional view of the conductor arrangement according to another embodiment of the present invention. In this embodiment, six conductors 1a to 1f for balanced six-phase are arranged in a ring shape in the sectional view. Six currents of balanced six-phase are substantially the same as the to-and-fro currents of balanced three-phase and when the phase relationship of the respective phases is represented in the phasor diagram of the alternating current theory, it is represented in the same diagram as FIG. 2. That is, the embodiment of FIG. 3 is identical to the embodiment of FIG. 1 except that the conductors 1a and 1f are adjacent to each other. In the embodiment of FIG. 3, the phase difference between the conductors 1f and 1a is also examined in addition to the phase differences between the conductors 1a and 1b, 1b and 1c, 1c and 1d, 1d and 1e, and 1e and 1f, respectively. That is, in all the combinations in allotting the currents of six phases of +U, −U, +V, −V, +W and −W to the conductors 1a to 1f, one combination is selected in which the sum of the phase differences between the currents flowing through every adjacent conductors is maximum and also the value of the smallest one of the phase differences between the currents flowing through every adjacent conductors is largest. The conductor arrangement is determined so that it corresponds to the conductor arrangement in the finally selected combination. For example, as shown in FIG. 3, the conductors 1a, 1b, 1c, 1d, 1e, and 1f are in the phases +U. −U, −W, −V, +V and +W, respectively. Thus, the phase differences between 1a and 1b, 1b and 1c, 1c and 1d, 1d and 1e, 1e and 1f, and 1f and 1a are 180, 120, 120, 180, 120, 120 degrees, respectively. The above phase differences are also shown in FIG. 3. Thus, the sum of the phase differences is 840 degrees which is maximum among all the above combinations. In addition, the smallest value of the phase differences between the currents of adjacent conductors is 120 degrees which is also largest among all the above combinations. The embodiment of FIG. 3 provides the same effects as the embodiment of FIG. 1.

Figure 4:
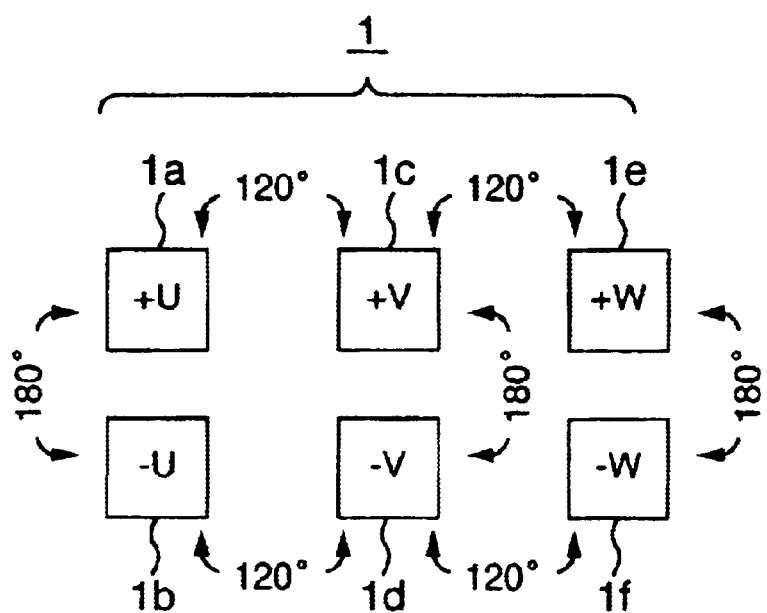
FIG. 4 is a sectional view of the conductor arrangement in power lines for alternating current according to still another embodiment of the present invention.

FIG. 4 shows the sectional view of the conductor arrangement according to another embodiment of the present invention. Six conductors 1a to 1f of six-phase are disposed in two rows in the sectional view. The embodiment of FIG. 4 is identical to the embodiment of FIG. 1 or 3 except for the disposition of the conductors. Each of the distances between the conductors 1a and 1b, 1c and 1d, and 1e and 1f is shorter than each of the distances between the conductors 1a and 1c, 1b and 1d, 1c and 1e, and 1d and 1f. For example, the phase difference between the currents flowing the conductors defining the smaller distance of 1a to 1b, or 1c to 1d or 1e to 1f is 180 degrees and the phase difference between the currents flowing the conductors defining the larger distance of 1a to 1c, or 1b to 1d, or 1c to 1e or 1d to 1f is 120 degrees. This relationship of the phase differences is shown in FIG. 4. By way of example, the conductor 1a is for the phase +U, 1b for the phase −U, 1c for the phase +V, 1d for the phase −V, 1e for the phase +W and if for the phase −W. That is, the conductor arrangement according to the embodiment of FIG. 4 has features in that the conductor arrangement is determined in the following manner. First, among all the combinations in arrangement of the conductors for allotting the currents of six phases of +U, −U, +V, −V, +W and −W to six conductors 1a to 1f, the conductors are arranged such that the sum of the phase differences between the currents flowing every nearest conductors (in the embodiment of FIG. 4, the conductors 1a to 1b, 1c to 1d and 1e to 1f) is maximum. Next, in the above arrangements of the conductors, such arrangement is selected in which the sum of the phase differences between the currents flowing the second nearest conductors (in the embodiment of FIG. 4, the conductors 1a to 1c, 1b to 1d, 1c to 1e and 1e to 1f) is largest. In the embodiment of FIG. 4, the conductors are arranged in two rows in the lengthwise and three stages in the widthwise, because this arrangement is most convenient for applying the above structure to the six conductors of six-phase. Incidentally, the embodiment of FIG. 4 provides the same effect as that of the embodiment of FIG. 1.

Further, it is possible to arrange 2n conductors of 2n-phase in two rows in the lengthwise and n stages in the widthwise such that the phase difference between the currents flowing adjacent conductors in each row is 180 degrees and the phase difference between the currents flowing adjacent conductors flowing in each stage is (180−180/n) degrees. This arrangement also provides the same effect as that of the embodiment of FIG. 1.

What is claimed is:

1. Power lines including four or more conductors disposed substantially parallelly with each other for transmitting alternating currents of different phases among at least three conductors, respectively, wherein said conductors are arranged in one combination of conductor arrangement in which the sum of phase differences between the currents flowing through adjacent conductors is maximum, and if a plurality of such combinations exist, said one combination is selected in which the value of the smallest one of the phase difference between the currents flowing through every adjacent conductors is largest.

2. Power lines including four or more conductors disposed in one row substantially parallelly with each other for transmitting alternating currents of different phases among at least three conductors, respectively, wherein said conductors are arranged in one combination of conductor arrangement in which the sum of phase differences between the currents flowing through adjacent conductors is maximum, and if a plurality of such combinations exists, said one combination is selected in which the value of the smallest one of the phase difference between the currents flowing through every adjacent conductors is largest.

3. Power lines including four or more conductors disposed in a ring shape and substantially parallelly with each other for transmitting alternating currents of different phases among at least three conductors, respectively, wherein said conductors are arranged in one combination of conductor arrangement in which the sum of phase differences between the currents flowing through adjacent conductors is maximum, and if a plurality of such combinations exists, said one combination is selected in which the value of the smallest one of the phase difference between the currents flowing through every adjacent conductors is largest.

4. Power lines including six conductors disposed in one row substantially parallelly with each other for transmitting to-and-fro alternating currents of +U, +V, +W, −U, −V and −W phases, respectively, wherein said conductors are arranged such that phase differences between the currents flowing through all adjacent conductors are in an order of phase angles of substantially 180, 120, 180, 120, 180 degrees, successively, from one end of the row.

5. Power lines including 2n (n=3, 4, 5, 6, ...) conductors disposed in one row substantially parallelly with each other for transmitting to-and-fro alternating currents of n-phase, wherein said conductors are arranged such that phase differences between the currents flowing through all adjacent conductors are in an order of phase angles of substantially 180, (180−180/n), 180, (180−180/n), ..., 180, (180−180/n) degrees, successively, from one end of the row.

6. Power lines including six conductors disposed in a ring shape substantially parallelly with each other for transmitting to-and-fro alternating currents of +U, +V, +W, −U, −V and −W phases, respectively, wherein said conductors are arranged such that phase differences between the currents flowing through all adjacent conductors are in an order of phase angles of substantially 180, 120, 120, 180, 120 and 120 degrees, successively, from one of the conductors in the ring shape.

7. Power lines including six conductors disposed in two rows and three stages and having lengths thereof provided substantially parallelly with each other for transmitting alternating currents of six phases, respectively, wherein said conductors are arranged such that a distance between adjacent conductors in each stage is larger than a distance between adjacent conductors in each row, the phase differences between the currents flowing through all adjacent conductors in each row are all substantially 180 degrees in phase angles, and the phase differences between the currents flowing through all adjacent conductors in each stage are all substantially 120 degrees.

8. Power lines including 2n (n=3, 4, 5, 6, ...) conductors disposed in two rows and n stages and having lengths thereof provided substantially parallelly with each other for transmitting alternating currents of 2n-phase, respectively, wherein said conductors are arranged such that a distance between adjacent conductors in each stage is larger than a distance between adjacent conductors in each row, and wherein phase differences between the currents flowing through all adjacent conductors in each row are all substantially 180 degrees in phase angles and the phase differences between the currents flowing through all adjacent conductors in each stage are all substantially (180−180/n) degrees.

9. Rotating electric machine operable by a power supply including more than four conductors disposed substantially parallelly with each other and transmitting alternating currents of different phases among at least three conductors, respectively, wherein said conductors are arranged in one combination of conductor arrangement in which the sum of phase differences between the currents flowing through adjacent conductors is maximum, and if a plurality of such combinations exists, said one combination is selected in which the value of the smallest one of the phase difference between the currents flowing through every adjacent conductors is largest, and said rotating electric machine rotates by receiving electric power from said conductors.

10. Electric apparatus operable by a power supply including four or more conductors disposed substantially parallelly with each other and transmitting alternating currents of different phases among at least three conductors, respectively, wherein said conductors are arranged in one combination of conductor arrangement in which the sum of phase differences between the currents flowing through adjacent conductors is maximum, and if a plurality of such combinations exists, said one combination is selected in which the value of the smallest one of the phase difference between the currents flowing through every adjacent conductors is largest, and said electric apparatus operates by receiving electric power from said conductors.

11. Power supply apparatus including a power generator supplying alternating currents of different phases among at least three conductors, respectively, through four or more conductors disposed substantially parallelly with each other, wherein said conductors are arranged in one combination of conductor arrangement in which the sum of phase differences between the currents flowing through adjacent conductors is maximum, and if a plurality of such combinations exists, said one combination is selected in which the value of the smallest one of the phase difference between the currents flowing through all adjacent conductors is largest, and said power supply apparatus including the power generator supplies electric power through said conductors.

12. Power conversion apparatus receiving and supplying alternating currents of different phases among at least three conductors, respectively, through four or more conductors disposed substantially parallelly with each other, wherein said conductors are arranged in one combination of conductor arrangement in which the sum of phase differences between the currents flowing through adjacent conductors is maximum, and if a plurality of such combinations exists, said one combination is selected in which the value of the smallest one of the phase difference between the currents flowing through every adjacent conductors is largest, and said power conversion apparatus supplies converted electric power through said conductors.

13. Power transmission line including four or more conductors disposed substantially parallelly with each other for transmitting alternating currents of different phases among at least three conductors, respectively, wherein said conductors are arranged in one combination of conductor arrangement in which the sum of phase differences between the currents flowing through adjacent conductors is maximum, and if a plurality of such combinations exists, said one combination is selected in which the value of the smallest one of the phase difference between the currents flowing through all adjacent conductors is largest, and said power transmission line transmits electric power through said conductors.

14. Power lines including four or more conductors disposed substantially side-by-side with each other for each transmitting alternating currents of different phases among at least three conductors, respectively, wherein said conductors are arranged in one combination of conductor arrangement in which the sum of phase differences between the currents flowing through adjacent conductors is maximum.

15. Power lines including four or more conductors disposed substantially parallelly with each other for transmitting alternating currents of different phases among at least three conductors, respectively, wherein, under a condition of a low frequency alternating current specified by neglecting a displacement current part of Maxwell's electromagnetic equations, said conductors are arranged in one combination of conductor arrangement in which the sum of phase differences between the currents flowing through adjacent conductors is maximum, and if a plurality of such combinations exist, said one combination is selected in which the value of the smallest one of the phase difference between the currents flowing through every adjacent conductors is largest.

* * * * *